(12) United States Patent
Mori

(10) Patent No.: US 6,553,119 B1
(45) Date of Patent: Apr. 22, 2003

(54) ACOUSTIC COMPONENT MOUNTING STRUCTURE FOR PORTABLE RADIO UNIT

(75) Inventor: Tatsuya Mori, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/546,509

(22) Filed: Apr. 11, 2000

(30) Foreign Application Priority Data

Apr. 13, 1999 (JP) .......................................... 11-104785

(51) Int. Cl.$^7$ ................................................ H04M 1/00
(52) U.S. Cl. ............................... 379/433.11; 379/433.02
(58) Field of Search ...................... 379/433.01, 433.02, 379/433.11; 455/575, 90

(56) References Cited

U.S. PATENT DOCUMENTS 6,321,070 B1 * 11/2001 Clark et al. ................... 455/90

FOREIGN PATENT DOCUMENTS

| JP | 4-40905 | 7/1992 |
|----|---------|--------|
| JP | 5-34753 | 5/1993 |
| JP | 6-61913 | 3/1994 |
| JP | 6-291819 | 10/1994 |
| JP | 7-3711 | 1/1995 |
| JP | 9-326851 | 12/1997 |

OTHER PUBLICATIONS

Copy of Japanese Office Action dated Dec. 24, 2002 and English translation of relevant portion.

* cited by examiner

Primary Examiner—Jack Chiang
(74) Attorney, Agent, or Firm—Dickstein, Shapiro, Morin & Oshinsky, LLP.

(57) ABSTRACT

A portable radio unit has a housing with a cavity defined in a surface thereof, and an acoustic component is housed in the cavity. A decorative panel is mounted on the housing in covering relation to the cavity. The acoustic component is sandwiched in position between the housing and the decorative panel.

8 Claims, 7 Drawing Sheets

ACOUSTIC COMPONENT MOUNTING STRUCTURE FOR PORTABLE RADIO UNIT

BACKGROUND OF THE INVENTION

1. Field of the Invention

The present invention relates to an acoustic component mounting structure for use in portable radio units.

2. Description of the Related Art

According to a conventional acoustic component mounting structure for use in portable radio units, as shown in FIGS. 1 and 2 of the accompanying drawings, a holder 9 with an acoustic component 7 mounted thereon is hooked on a circuit board 6, which is mounted in a front case 1 by circuit board hooks 15. The acoustic component 7 thus placed in the front case 1 is pressed against a gasket 91 mounted in the front case 1.

The conventional acoustic component mounting structure is problematic in that since dimensional variations of the holder 9 and the circuit board 6 affect the positional relationship between the gasket 91 and the acoustic component 7, the hermetic sealing provided between the gasket 91 and the acoustic component 7 also varies due to the dimensional variations of the holder 9 and the circuit board 6, tending to result in an acoustic characteristic degradation due to sound leakage.

Another problem of the conventional acoustic component mounting structure is that because many parts are required to secure the acoustic component 7 in position, the available area for mounting parts on the circuit board 6 in the front case 1 is limited.

SUMMARY OF THE INVENTION

It is therefore an object of the present invention to provide an acoustic component mounting structure for use in portable radio units which reduces positional variations between an acoustic component and a gasket for increased reliability of acoustic characteristics, and allows the available area for mounting parts on a circuit board to be utilized effectively.

According to the present invention, an acoustic component mounting structure for use in a portable radio unit has a portable radio unit housing having a cavity defined in a surface thereof, a decorative panel mounted on the portable radio unit housing in covering relation to the cavity, and an acoustic component housed in the cavity and sandwiched between the portable radio unit housing and the decorative panel.

The portable radio unit housing may have a recess defined in a surface thereof, the decorative panel being held in the recess, the cavity being defined in a bottom of the recess.

The acoustic component mounting structure may further have an electric conductor inserted into the cavity and connected to the acoustic component, the cavity having a through hole defined in a bottom thereof, the electric conductor extending through the through hole into the portable radio unit housing.

The electric conductor may comprise a connecting terminal which comprises a metal plate.

Alternatively, the electric conductor may comprise a flexible board.

The decorative panel may have a through hole defined therein at a position facing the acoustic component for passing guiding sounds produced by the acoustic component out of the portable radio unit housing.

The acoustic component mounting structure may further comprise a gasket mounted on a reverse side of the decorative panel in surrounding relation to the through hole, and pressed against the acoustic component.

The acoustic component mounting structure may further comprise an adhesive tape attached to a reverse side of the decorative panel and fixing the decorative panel to the portable radio unit housing.

The hermetic sealing of an acoustic space defined in front of the acoustic component is basically determined by the accuracy with which the portable radio unit housing has been molded. Since the accuracy with which the front case is molded can easily be controlled, the hermetic sealing of the acoustic space can sufficiently be achieved.

Furthermore, because the acoustic component is directly held by the portable radio unit housing, no parts are required to secure the acoustic component in position.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

A portable radio unit incorporating an acoustic component mounting structure according to an embodiment of the present invention will be described below with reference to FIGS. 3 through 5.

Figure 1:
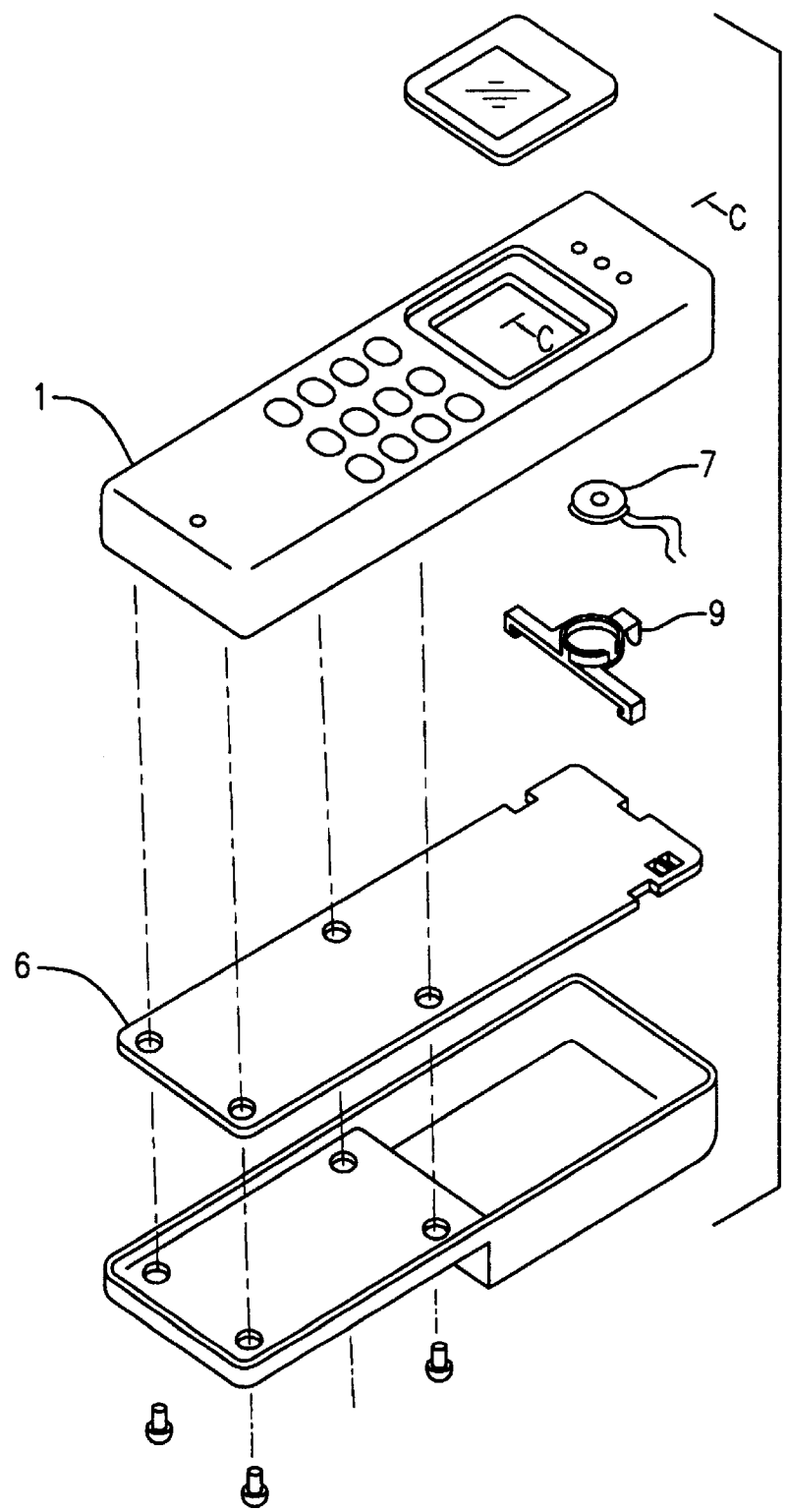
FIG. 1 is an exploded perspective view of a conventional acoustic component mounting structure for use in a portable radio unit.
Figure 2:
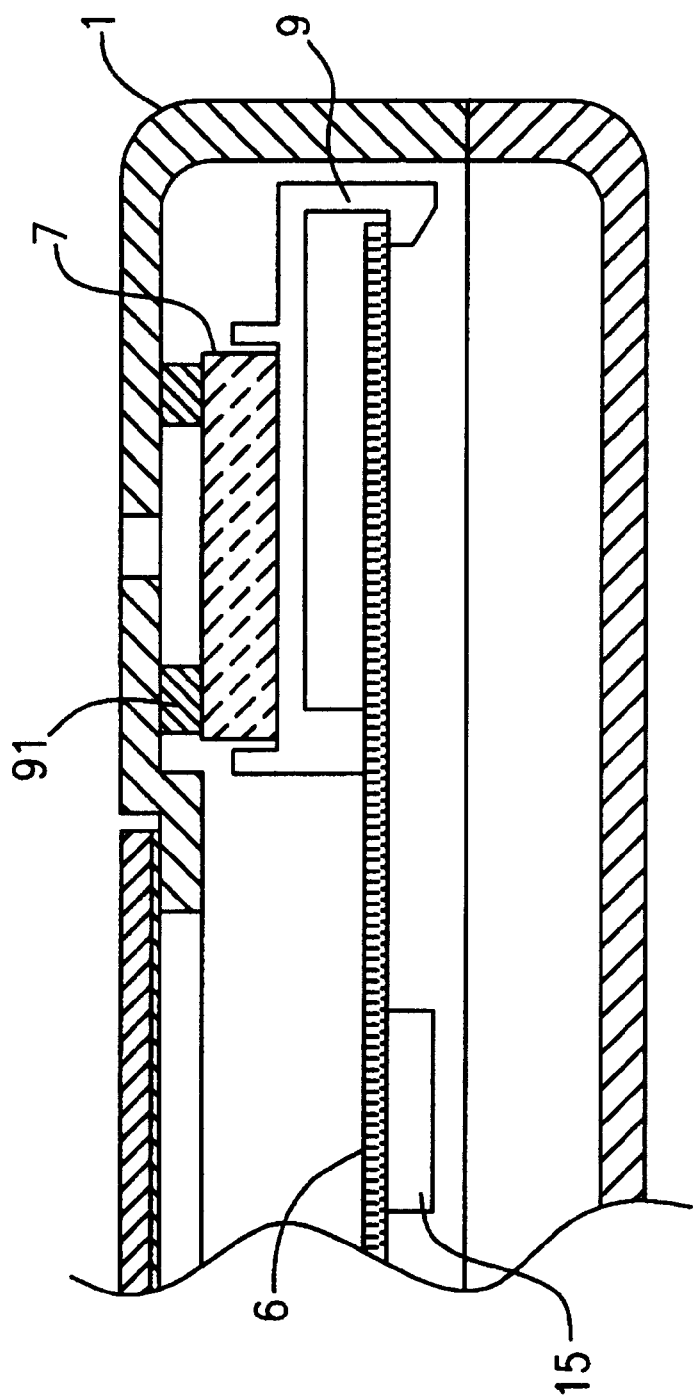
FIG. 2 is an enlarged fragmentary cross-sectional view taken along line C—C of FIG. 1, showing the portable radio unit as assembled.
Figure 3:
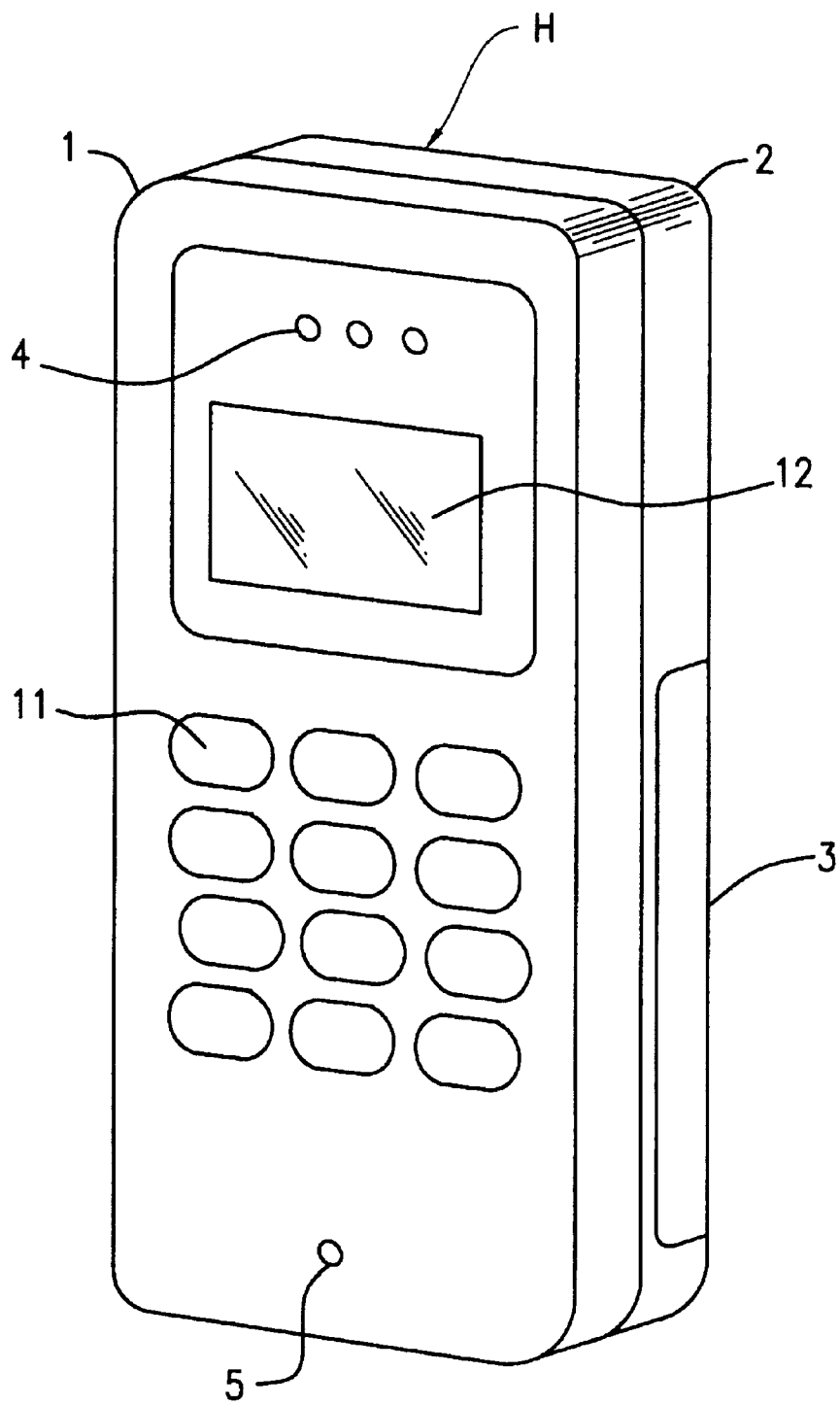
FIG. 3 is a perspective view of a portable radio unit incorporating an acoustic component mounting structure according to an embodiment of the present invention.

As shown in FIG. 3, the portable radio unit has a housing H including a front case 1 and a rear case 2 held in abutment against the front case 1, and a cell 3 removably mounted on the housing H. The housing H supports thereon dial buttons 11 for entering telephone numbers and other information, and a display unit 12 for displaying telephone numbers and other information entered by the dial buttons 11.

The housing H also has a speaker port 4 positioned above the display unit 12 for listening to the voice of a party which the user of the portable radio unit is communicating with, and a microphone port 5 positioned below the dial buttons 11 for entering the voice of the user of the portable radio unit.

Figure 4:
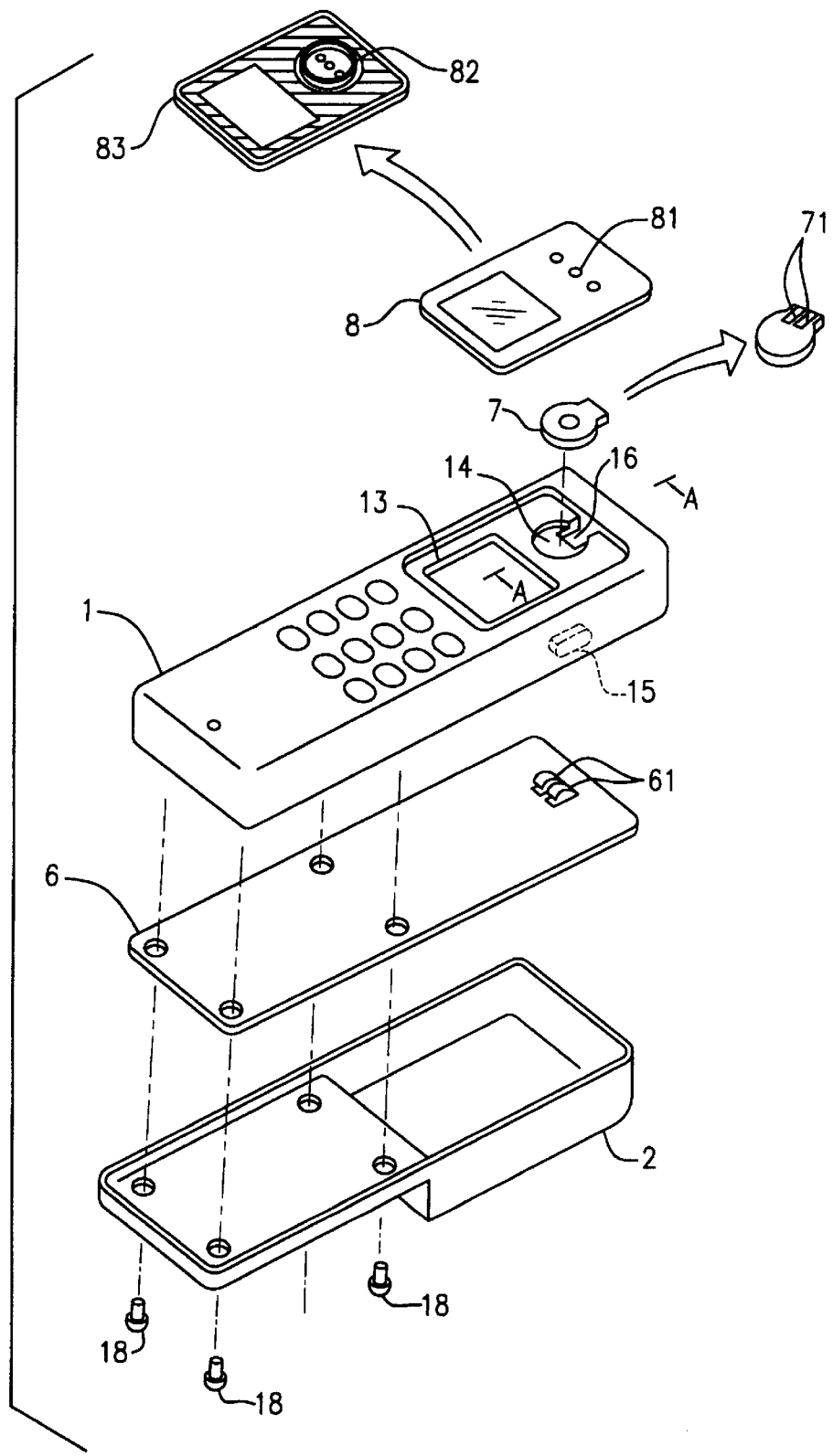
FIG. 4 is an exploded perspective view of the portable radio unit shown in FIG. 3.
Figure 5:
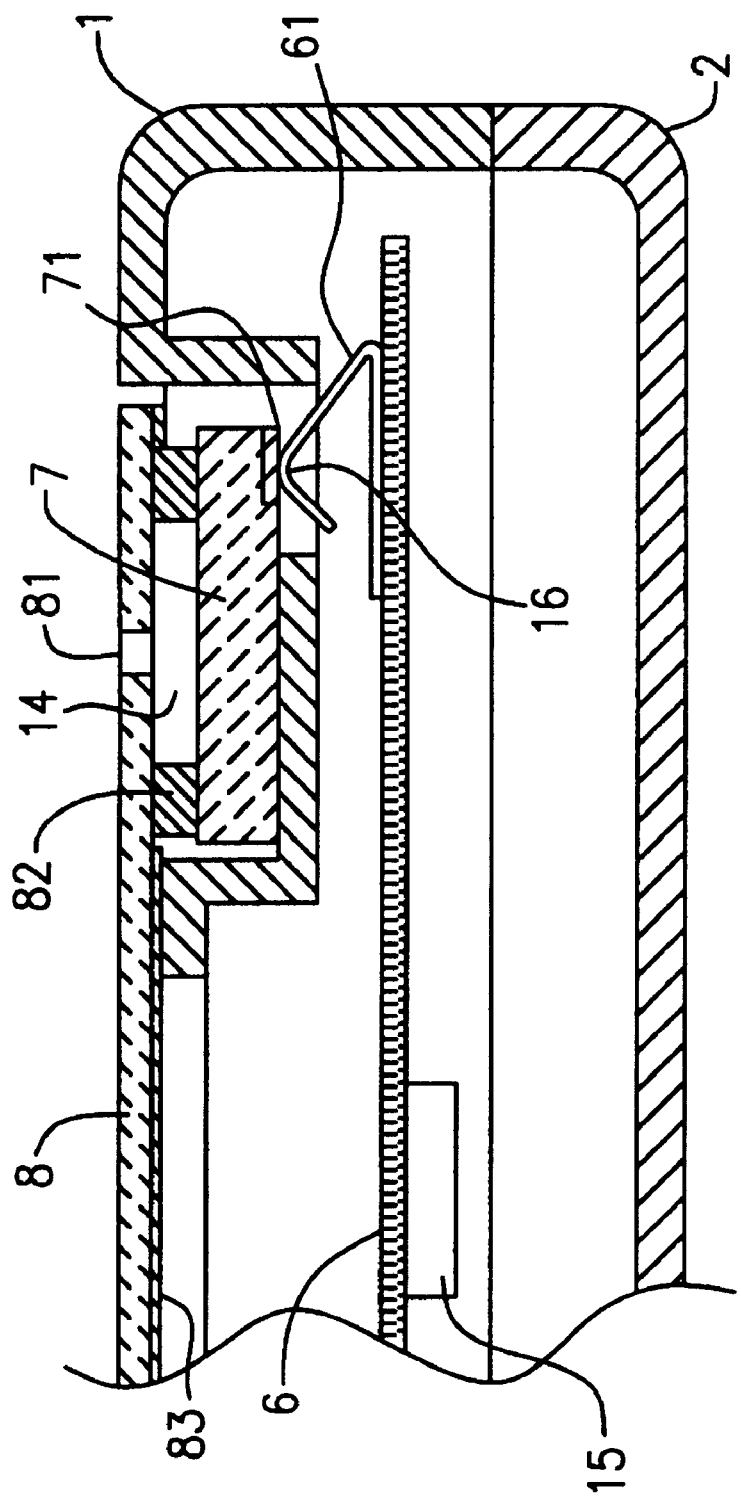
FIG. 5 is an enlarged fragmentary cross-sectional view taken along line A—A of FIG. 4, showing the portable radio unit as assembled.

As shown in FIGS. 4 and 5, the front case 1 has a decorative panel attachment region 13 defined as a recess therein for holding therein a decorative panel 8 which covers the display unit 12. The decorative panel 8 has a view window for the user to see the display unit 12 therethrough. The decorative panel attachment region 13 has a cavity 14 defined in an upper portion thereof for mounting an acoustic component (a receiver in this embodiment) 7 therein.

The front case 1 has on inner side surfaces thereof hooks 15 for engaging a circuit board 6. The bottom of the cavity 14 has a through hole 16 defined therein for exposing a connecting terminal 71, which is an electric conductor, of the acoustic component 7 therethrough toward the reverse side of the front case 1.

The decorative panel 8 has through holes 81 defined therein at a position facing the acoustic component 7 for guiding sounds produced by the acoustic component 7 out of the front case 1. A gasket 82 is mounted on the reverse side of the decorative panel 8 in surrounding relation to the through holes 81. The gasket 82 is pressed against the acoustic component 7 and defines an acoustic space between the acoustic component 7 and the decorative panel 8. The decorative panel 8 is bonded to the front case 1 by an adhesive tape 83 attached to the reverse side of the decorative panel 8.

The circuit board 6 has a connecting terminal 61, which is an electric conductor in the form of a metal plate, mounted on an end thereof which is held against the connecting terminal 71 of the acoustic component 7 when the circuit board 6 is mounted in the front case 1.

The portable radio unit according to this embodiment is assembled as follows:

The acoustic component 7 is placed in the cavity 14 in the front case 1, and the decorative panel 8 is placed in the decorative panel attachment region 13, and bonded to the front case 1 by the adhesive tape 83. Then, the circuit board 6 is placed in the front case 1 and engaged by the hooks 15 of the front case 1. Thereafter, the rear case 2 is fastened to the front case 1 by a plurality of screws 18.

With the circuit board 6 mounted in the front case 1, the connecting terminal 71 of the acoustic component 7, which is exposed toward the reverse side of the front case 1, is pressed against the connecting terminal 61 of the circuit board 6 which is inserted in the through hole 16.

In the portable radio unit thus assembled, the acoustic component 7 is sandwiched and fixed in position between the front case 1 and the decorative panel 8 attached to the front case 1, with the gasket 82 interposed between the decorative panel 8 and the acoustic component 7.

If the gasket 82 has constant dimensional accuracy, then the hermetic sealing of the acoustic space defined between the acoustic component 7 and the decorative panel 8 by the gasket 82 is determined substantially uniquely by the accuracy with which the front case 1 has been molded.

Since the accuracy with which the front case 1 is molded can easily be controlled, the hermetic sealing of the acoustic space defined between the acoustic component 7 and the decorative panel 8 by the gasket 82 can sufficiently be achieved, thus preventing an acoustic characteristic degradation due to sound leakage.

Because the acoustic component 7 is directly held by the front case 1, no parts are required to secure the acoustic component 7 between itself and the circuit board 6. Therefore, the available mounting area on the circuit board 6 can be utilized effectively.

A portable radio unit incorporating an acoustic component mounting structure according to another embodiment of the present invention will be described below with reference to FIGS. 6 and 7.

Figure 6:
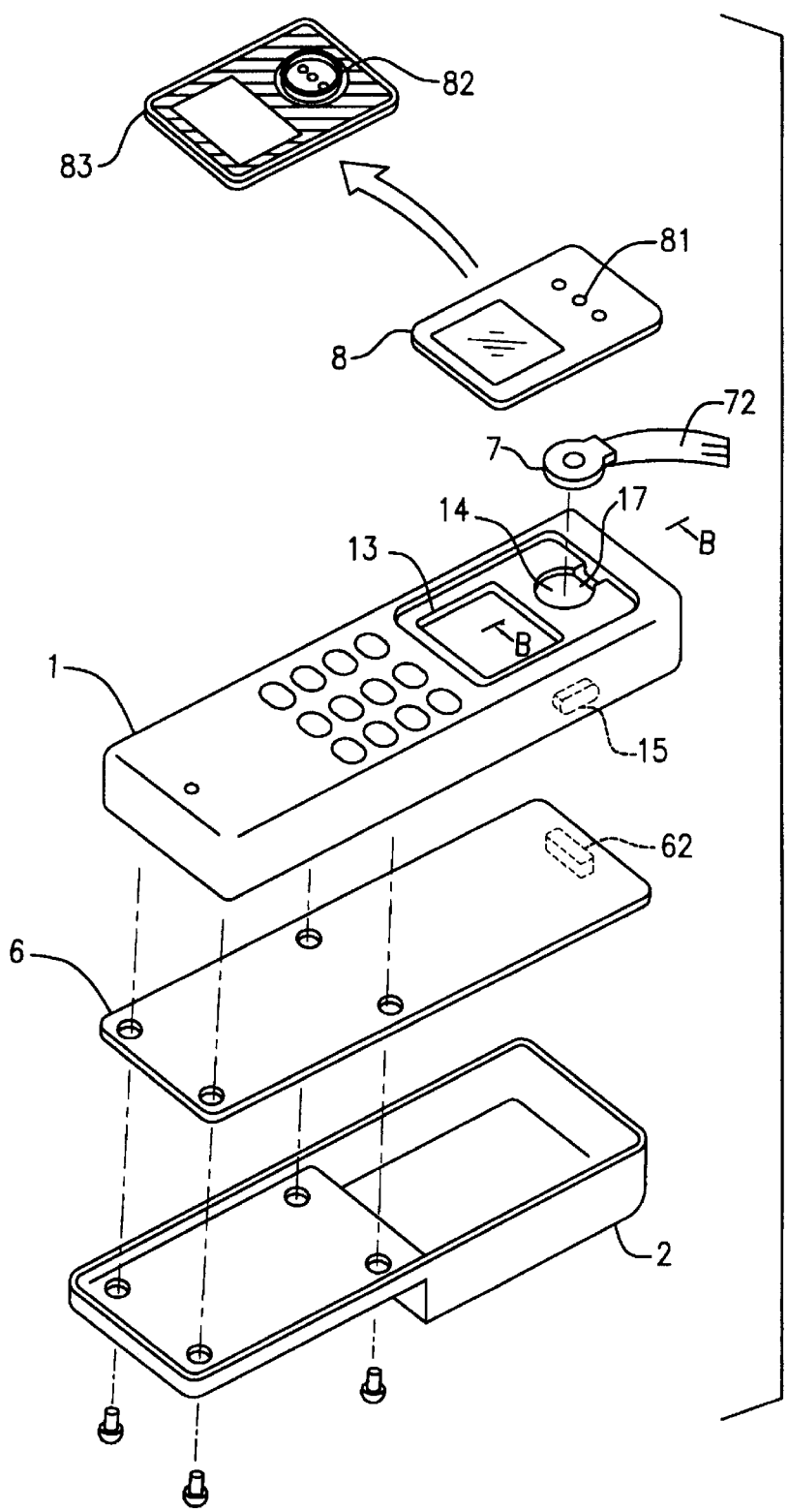
FIG. 6 is an exploded perspective view of a portable radio unit incorporating an acoustic component mounting structure according to another embodiment of the present invention.
Figure 7:
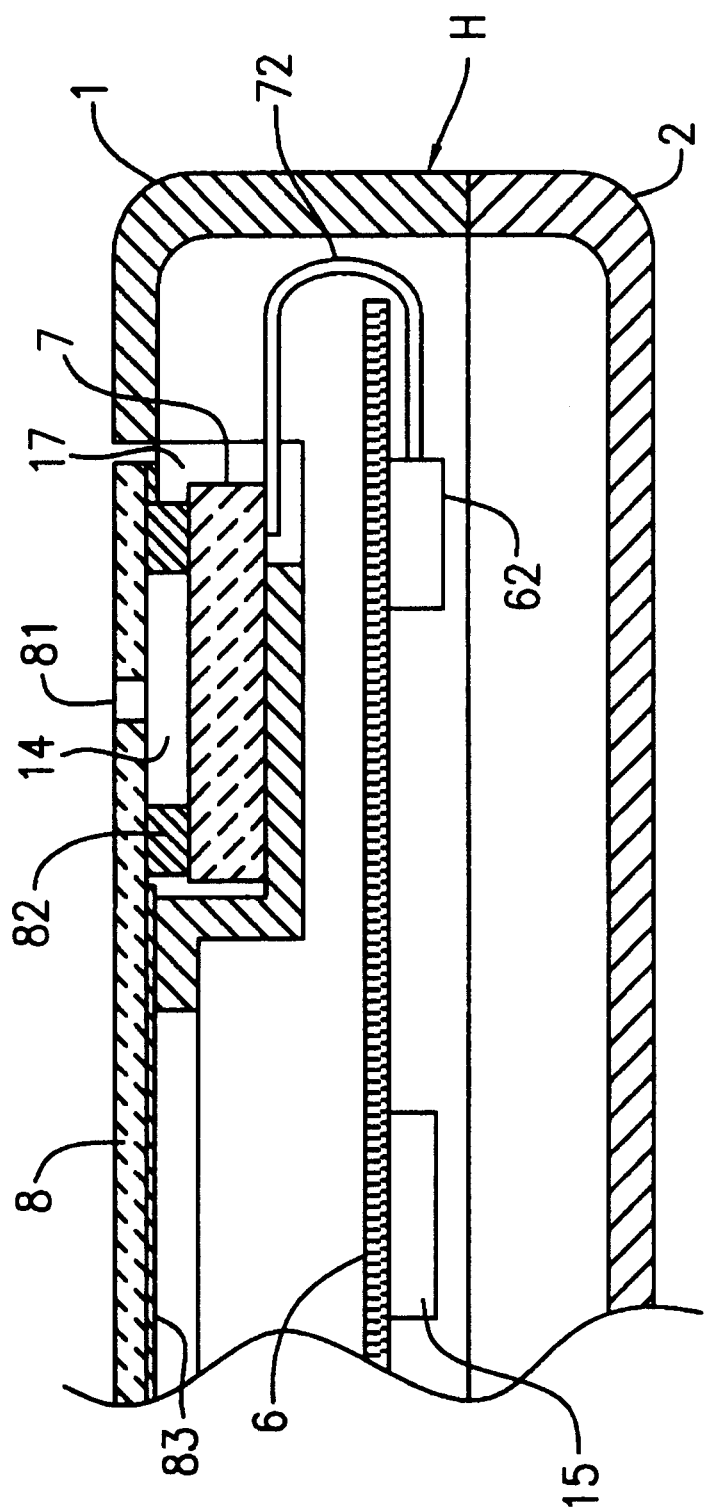
FIG. 7 is an enlarged fragmentary cross-sectional view taken along line B—B of FIG. 6, showing the portable radio unit as assembled.

As shown in FIGS. 6 and 7, a front case 1 has in its surface a decorative panel attachment region 13 for housing a decorative panel 8, and a cavity 14 for mounting an acoustic component 7 therein. The front case 1 also has hooks 15 on its inner surface for engaging a circuit board 6.

A side wall of the cavity 14 has a through hole 17 defined therein for the insertion therethrough of an electrically conductive flexible board 72 of the acoustic component 7. The circuit board 6 has a connector 62 to which the flexible board 72 is connected. Other structural details of the portable radio unit shown in FIGS. 6 and 7 are substantially the same as those of the portable radio unit shown in FIGS. 3 through 5, and will not be described below.

Even when the positional relationship between the circuit board 6 and the acoustic component 7 varies, the variation is taken up by the flexible board 72, so that the electric connection between the circuit board 6 and the acoustic component 7 remains stable.

The shapes and dimensions indicated in the above illustrated embodiments are:by way of example only, and may be changed based on design requirements.

With the acoustic component mounting structure thus constructed according to the present invention, the hermetic sealing of the acoustic space defined in front of the acoustic component is basically determined by the accuracy with which the front case has been molded. Since the accuracy with which the front case is molded can easily be controlled, the hermetic sealing of the acoustic space can sufficiently be achieved, thus preventing an acoustic characteristic degradation due to sound leakage.

Furthermore, because the acoustic component is directly held by the front case, no parts are required to secure the acoustic component between itself and the circuit board. Therefore, the available parts mounting area on the circuit board can be utilized effectively.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. An acoustic component mounting structure for use in a portable radio, comprising:

a portable radio housing having an inner and outer surface and a cavity defined in said outer surface thereof;

a decorative panel mounted on said outer surface of said portable radio housing in covering relation to said cavity;

an acoustic component housed in said cavity and sandwiched between said portable radio housing and said decorative panel; and an electric conductor inserted into said cavity and connected to said acoustic component, said cavity having a through hole defined in a bottom thereof, said electric conductor extending through said through hole into said portable radio housing.

2. An acoustic component mounting structure according to claim 1, wherein said portable radio housing has a recess defined in said outer surface thereof, said decorative panel being held in said recess, said cavity being defined in a bottom of said recess.

3. An acoustic component mounting structure according to claim 1, wherein said electric conductor comprises a metal plate.

4. An acoustic component mounting structure according to claim 1, wherein said electric conductor comprises a flexible board.

5. An acoustic component mounting structure according to claim 1, wherein said decorative panel has a through hole defined therein at a position facing said acoustic component for passing guiding sounds produced by said acoustic component out of said radio housing.

6. An acoustic component mounting structure according to claim 5, further comprising a gasket mounted on a reverse side of said decorative panel in surrounding relation to said through hole, and pressed against said acoustic component.

7. An acoustic component mounting structure according to claim 1, further comprising an adhesive tape attached to a reserve side of said decorative panel and fixing said decorative panel to said portable radio housing.

8. An acoustic component mounting structure for use in a portable radio, comprising:

a portable radio housing an inner and outer surface, said outer surface having a cavity defined therein, a decorative panel mounted on said outer surface of said portable radio housing in covering relation to said cavity;

an acoustic component housed in said cavity and sandwiched between said portable radio housing and said decorative panel, said acoustic component having a face and a back side and a pair of contacts mounted on said back side of said acoustic component, said pair of contacts mating with an electric conductor, said electric conductor inserted into said cavity and connected to said acoustic component, said cavity having a through hole defined in a bottom thereof, said electric conductor extending through said through hole into said portable radio housing, wherein said electric conductor is selected from the group consisting of a spring finger and a ribbon contact.

* * * * *